S. H. HAMILTON.

Assignor, by mesne assignments, to H. W. PORTER.

MANUFACTURE OF PAPER BOARD.

No. 10,386. Reissued Sept. 25, 1883. 2328

154
138

Fig. 1.

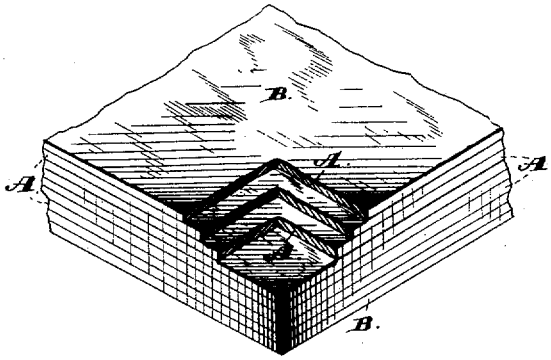

MANUFACTURE OF PAPER BOARDS. SILAS H. HAMILTON, [illegible], Kans., assignor, by mesne assignments, to Henry W. Porter, Chicago, Ill. Reissued Sept. 6, 1883. Original No. 269,785, dated Dec. 26, 1882. Division A.

10,386.

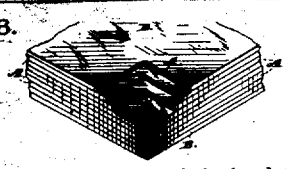

*Claim.*—1. The process of producing boards for building purposes, which consists in saturating or coating several sheets of paper-stock with cement, and in then pressing the cemented sheets together, uniting them under heat and pressure, thereby forming a strong, dense, and durable plank for building purposes, substantially as set forth.

2. The process herein described, which consists of saturating several sheets of paper with resin and oil and subjecting said sheets to heat and pressure for the purpose of forming a dense, strong, and durable plank for building purposes.

3. The process herein described, which consists in saturating several sheets of paper with resin and oil, coating said sheets with a solution of manila-cord and lime, and finally subjecting such prepared sheets to heat and pressure for the purpose of forming a dense, strong, and durable plank for building purposes.

Fig. 2.

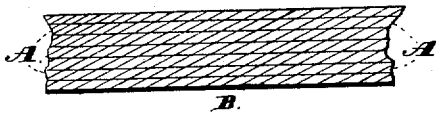

Witnesses:
Jas. E. Hutchinson.
Henry E. Hazard.

Inventor.
S. H. Hamilton, by
Prindle & Russell, his Attys.

N. PETERS, Photo-Lithographer, Washington, D. C.

154 LAMINATED FABRIC &
ANALOGOUS MANUFACTURES

SEARCH ROOM

138

UNITED STATES PATENT OFFICE.

SILAS H. HAMILTON, OF LAWRENCE, KANSAS, ASSIGNOR, BY MESNE ASSIGNMENTS, TO HENRY W. PORTER, OF CHICAGO, ILLINOIS.

MANUFACTURE OF PAPER BOARDS.

SPECIFICATION forming part of Reissued Letters Patent No. 10,386, dated September 25, 1883.

Original No. 269,785, dated December 26, 1882. Application for reissue filed September 6, 1883.

DIVISION A.

*To all whom it may concern:*

Be it known that I, SILAS H. HAMILTON, of Lawrence, in the county of Douglas, and in the State of Kansas, have invented certain new and useful Improvements in the Manufacture of Paper Boards; and I do hereby declare that the following is a full, clear, and exact description thereof, reference being had to the accompanying drawings, making a part of this specification, in which—

Figure 1 is a perspective view of my improved board, a portion of one edge being broken to show the manner of combining the sheets; and Fig. 2 is a cross-section of the same.

Letters of like name and kind refer to like parts in each of the figures.

The design of my invention is to render practicable the employment of paper for purposes to which wood, metal, or stone has heretofore been applied; and to this end it consists in a process of producing an improved article of manufacture, composed of a board formed of several sheets of paper saturated with resin and oil, then coated with a solution of milk-curd and lime, and finally passed through heated pressure-rollers, substantially as and for the purpose hereinafter specified.

In the use of my invention I take sheets of paper A, preferably made from straw or cane, and pass the same through a heated solution of resin and oil—preferably linseed or paraffine—in the proportion of two hundred and eighty pounds of resin to two gallons of oil, after which said sheets are permitted to remain until dry. I next coat one side of each sheet A, except that intended for the lower side of the board, with a mixture of milk-curd and slaked lime, in the proportion of three parts of milk-curd to one part of lime, after which said sheets are passed between heated rollers and subjected to a heavy pressure, which causes them to adhere together and to form a board, B, that has any desired thickness or size. After the board B has been formed, as described, it is placed within a press and subjected to a moderate pressure until thoroughly cool, when it is ready for use.

The board thus constructed is thoroughly homogeneous, is entirely unaffected by water or dampness, is in a great degree fire-proof, and possesses greater density, strength, and durability than is possessed by any of the woods ordinarily used for building purposes.

Having thus fully set forth the nature and merits of my invention, what I claim as new, is—

1. The process of producing boards for building purposes, which consists in saturating or coating several sheets of paper-stock with a cement, and in then pressing the cemented sheets together, uniting them under heat and pressure, thereby forming a strong, dense, and durable plank for building purposes, substantially as set forth.

2. The process herein described, which consists of saturating several sheets of paper with resin and oil and subjecting said sheets to heat and pressure for the purpose of forming a dense, strong, and durable plank for building purposes.

3. The process herein described, which consists in saturating several sheets of paper with resin and oil, coating said sheets with a solution of milk-curd and lime, and finally subjecting such prepared sheets to heat and pressure for the purpose of forming a dense, strong, and durable plank for building purposes.

SILAS H. HAMILTON.

Witnesses:
GEO. H. EVANS,
JOS. BROWNE.